(12) United States Patent
Rothschild-Keita et al.

(10) Patent No.: US 12,664,477 B2
(45) Date of Patent: Jun. 23, 2026

(54) COMPUTING ITEM FINDABILITY THROUGH A FINDABILITY MACHINE-LEARNING MODEL

(71) Applicant: Maplebear Inc., San Francisco, CA (US)

(72) Inventors: Amalia Rothschild-Keita, Berkeley, CA (US); Brent Scheibelhut, Toronto (CA); Mark Oberemk, Toronto (CA); Hua Xiao, Toronto (CA); Shaun Navin Maharaj, Vaughan (CA); Taha Amjad, Toronto (CA)

(73) Assignee: Maplebear Inc., San Francisco, CA (US)

( * ) Notice: Subject to any disclaimer, the term of this patent is extended or adjusted under 35 U.S.C. 154(b) by 560 days.

(21) Appl. No.: 18/339,203

(22) Filed: Jun. 21, 2023

(65) Prior Publication Data

US 2024/0428125 A1     Dec. 26, 2024

(51) Int. Cl.
*G06N 20/00* (2019.01)
(52) U.S. Cl.
CPC .................................... *G06N 20/00* (2019.01)
(58) Field of Classification Search
None
See application file for complete search history.

(56) References Cited

U.S. PATENT DOCUMENTS

| | | | |
|---|---|---|---|
| 2005/0021561 A1* | 1/2005 | Noonan | G06Q 30/06 |
| 2021/0365883 A1* | 11/2021 | Marbut, Jr. | G06Q 10/087 |
| 2024/0070747 A1* | 2/2024 | Loi | G06Q 30/0281 |
| 2024/0242174 A1* | 7/2024 | Stanke | G06Q 10/06311 |
| 2024/0420223 A1* | 12/2024 | Terborg | G06Q 30/02017 |

* cited by examiner

*Primary Examiner* — William J. Goodchild
(74) *Attorney, Agent, or Firm* — Fenwick & West LLP

(57) ABSTRACT

An online concierge system uses a findability machine-learning model to predict the findability of items within a physical area. The findability model is a machine-learning model that is trained to compute findability scores, which are scores that represent the ease or difficulty of finding items within a physical area. The findability model computes findability scores for items based on an item map describing the locations of items within a physical area. The findability model is trained based on data describing pickers that collect items to service orders for the online concierge system. The online concierge system aggregates this information across a set of pickers to generate training examples to train the findability model. These training examples include item data for an item, an item map data describing an item map for the physical area, and a label that indicates a findability score for that item/item map pair.

20 Claims, 4 Drawing Sheets

COMPUTING ITEM FINDABILITY THROUGH A FINDABILITY MACHINE-LEARNING MODEL

BACKGROUND

Retailers display items within the physical area of their stores. Patrons of the retailers commonly enter the stores looking for specific items that they want to purchase. However, to purchase the items, patrons first must find the items within the physical area and collect the items. Since stores commonly provide many different items, patrons may have difficulty finding items within the physical areas. While stores may organize items to help patrons determine where items are located (e.g., by grouping together items within a category), items may be difficult to find within those sections or it may be difficult to determine which section an item is located in.

To improve the ability of patrons to find items, retailers may use questionnaires to ask patrons how much trouble they had finding the items they wanted to purchase. However, these questionnaires can be inaccurate because they rely on the subjective experience of patrons within the stores. Questionnaires also require a significant period of time to administer, so stores cannot effectively iterate on where they locate items within their physical areas. Thus, retailers lack an accurate and effective measure for the ease or difficulty of finding items within their physical areas.

SUMMARY

In accordance with one or more aspects of the disclosure, an online concierge system uses a findability machine-learning model to predict the findability of items within a physical area. A findability model is a machine-learning model that is trained to compute findability scores, which are scores that represent the ease or difficulty of finding items within a physical area. For example, a findability score for an item may be a function of the average time it takes a user to find the item within a physical space and the rate at which the item is actually found within the physical space by users looking for the item. The findability model computes findability scores for items based on an item map describing the locations of items within a physical area. Thus, the findability model predicts the findability of an item within a physical area based on a corresponding item map.

The findability model is trained based on data describing pickers that collect items to service orders for the online concierge system. For example, the online concierge system can track whether a picker is able to find an item within a physical area and how long it takes for the picker to find the item. The online concierge system aggregates this information across a set of pickers to generate training examples to train the findability model. These training examples include item data for an item, an item map data describing an item map for the physical area, and a label that indicates a findability score for that item/item map pair. As noted above, the findability score may be a function of the rate at which pickers actually find the item and the average time a picker takes to find the item within a physical area.

The online concierge system may use the trained findability model to optimize item maps for physical areas. For example, the online concierge system may apply an iterative process whereby the online concierge system continually improves the findability of items of successive candidate item maps. To start this iterative process, the online concierge system accesses an initial item map for a physical area and generates a candidate item map based on that initial map. The online concierge system generates the candidate map by applying a set of map rules to the initial map, where these map rules are constraints or heuristics for an item map. The online concierge system computes findability scores for the set of items in the candidate item map by applying the findability model to the items and the candidate item map, and uses these findability scores to compute an overall score for the item map.

The online concierge system determines whether a stopping condition is met based on the overall score for the candidate item map. For example, the online concierge system may determine whether the overall score exceeds some threshold value. If the stopping condition is not met, the online concierge system repeats the iterative process but with the candidate item map instead of the initial item map. If the stopping condition is met, the online concierge system selects the candidate item map as a new item map for the physical area and transmits that new item map to a user associated with the physical space.

As noted above, it is generally difficult to capture data describing how easy it is for patrons within a store to find items therein. However, by leveraging data collected based on pickers servicing orders, an online concierge system not only quantifies an otherwise difficult to quantify concept, but the online concierge system can train a machine-learning model that predicts the findability of items within a physical area according to an item map. Thus, through machine-learning, the online concierge system can quantifiably improve the findability of items located within a physical area.

DETAILED DESCRIPTION

Figure 1:
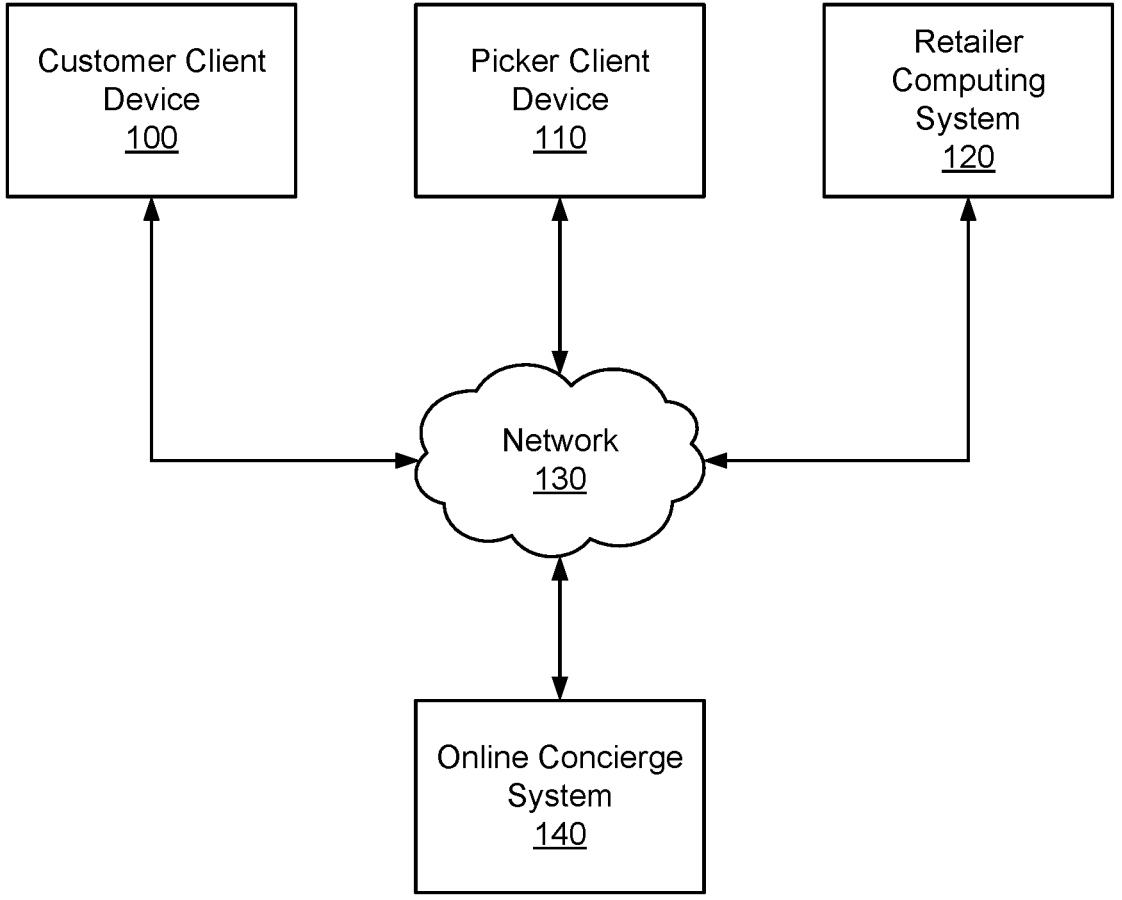
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
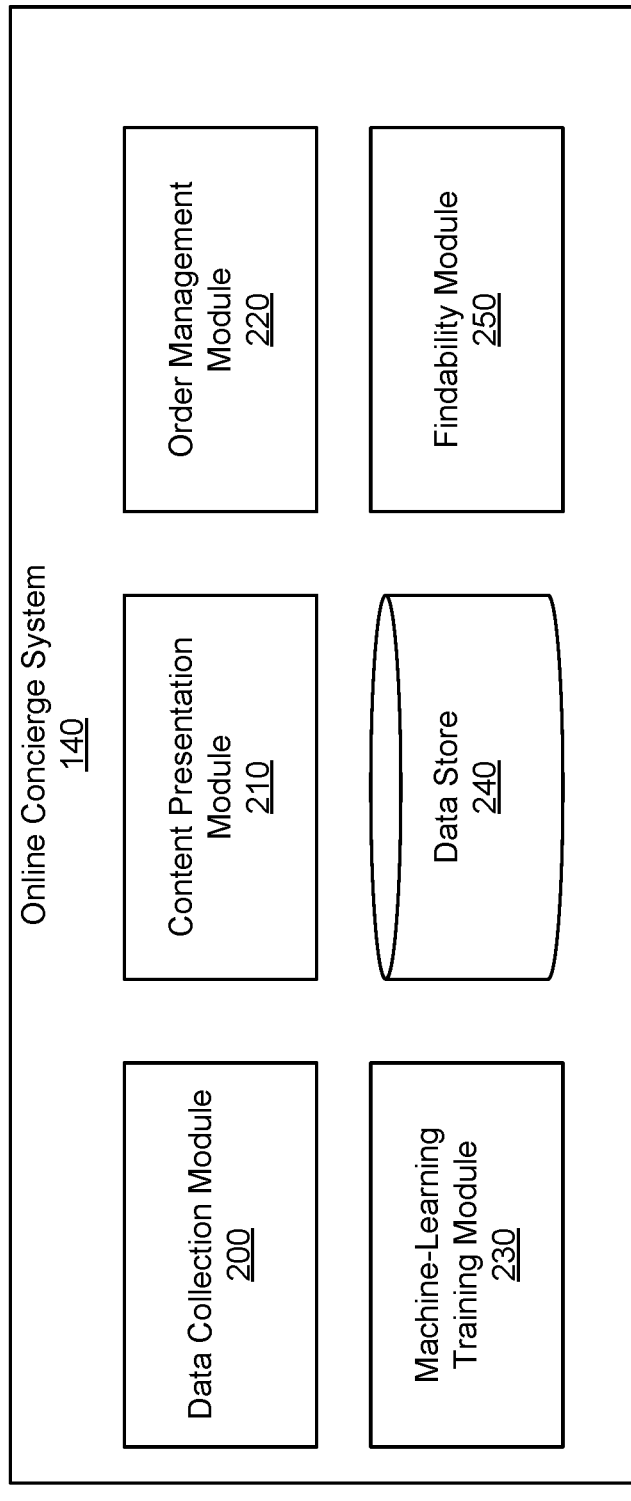
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The findability module 250 determines the findability of items within a retailer location's physical area. For example, the findability module 250 may compute findability scores for items by applying a findability model to the items and to an item map describing where items are located within a physical area. The findability module 250 also may iteratively generate candidate item maps for a physical area based on the findability scores of items within those item maps to recommend a new item map for a physical area. Findability scores, findability models, and the generation of candidate item maps is described in further detail below.

Figure 3:
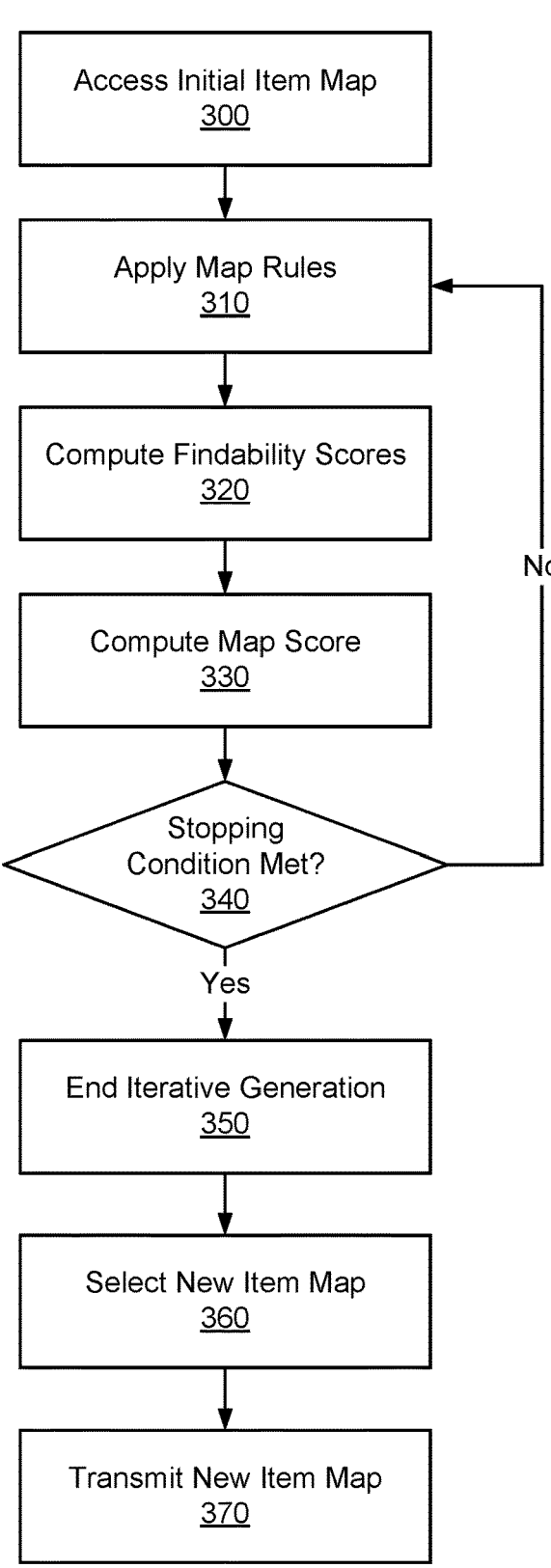
FIG. 3 is a flowchart for a method of generating an item map for a physical area based on a findability model, in accordance with some embodiments.

FIG. 3 is a flowchart for a method of generating an item map for a physical area based on a findability model, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system accesses 300 an initial item map. An item map is a map that indicates where a set of items are located within a physical area. For example, an item map may be a planogram for a retailer location. The item map may further indicate sections of the physical area that contain items of a particular type or category. For example, the item map may indicate a "dairy section" or a "bakery" section of a retailer location. The item map may correspond to a real physical area in which items are actually displayed or may correspond to a plan for how items would be located within a physical area. The item map may also include data describing the physical area itself or typical users who are located within the physical area. For example, the item map may indicate where the physical area is located within a broader geographic region, demographic information for users, or the locations of entrances/exits, bathrooms, point-of-sale terminals, warehouses, or storage areas within the physical area. The item map may further include information describing structures displaying items within the physical area, such as the locations, height, and number of shelves within the physical area.

The online concierge system generates a new item map for the physical area through an iterative generation process whereby the online concierge system generates new item maps, scores them based on the findability of items within the item maps, selects a new item map for the physical area when a stopping condition is met.

The online concierge system starts this iterative process by generating a candidate map based on the initial item map. More specifically, the online concierge system applies 310 a set of map rules to the initial item map to generate the candidate map. The set of map rules are a set of constraints or heuristics for generating a candidate map based on a previous item map. For example, the map rules may require that more popular items or item categories be located near the ends of aisles, or may require that certain items be placed as close as possible to related items. In some embodiments, the set of map rules include rules that account for consideration provided to the online concierge system for placing items in certain locations within the store. For example, an item manufacturer may provide consideration to the online concierge system for their items to be placed in prominent locations.

The online concierge system computes 320 a set of findability scores for the candidate item map. A findability score is a score that represents the ease or difficulty of finding a particular item within the physical area when the items are located according to the candidate map. Thus, a findability score is based on an item/item map pair in that it represents the findability of the item within that item map. The findability score may be based on the "average find time" of the item, which is an average time it takes for a user to find an item within the physical area with the candidate item map. The findability score also may be based on the "find rate" of the item, which is the rate at which users are actually able to find the item when searching for it within the candidate item map. In some embodiments, the findability score is based on a function of the average find time and the findability rate of the item and candidate item map. For example, the findability score may be based on a ratio of the find rate to the average find time.

The online concierge system computes the findability scores by applying a findability model to the items and the candidate maps. A findability model is a machine-learning model (e.g., a neural network) that is trained to predict the findability of an item within an item map. The findability model is trained to compute findability scores for item/item map pairs based on a set of training examples. Each training example includes item data for an item and item map data describing an item map. Each training example is also labeled with a findability score representing the findability of the item in the item map. The training examples may also include user data describing users who were looking for the item or contextual data describing the context within which those users were looking for the item (e.g., time of day, day of the week, season, or weather).

In some embodiments, the online concierge system may compute the findability label for a training example based on pickers servicing orders within physical areas. For example, the online concierge system may transmit an item to a picker's client device for a picker to collect from a physical area. The online concierge system tracks whether the picker is able to locate the item, and if so how long it takes the picker to collect the item (e.g., how long it takes for the picker to report that they have collected the item). The online concierge system may use this tracked information on pickers collecting items to compute an average find time and a find rate for the physical area over a period of time, and thereby compute a findability score for the item. The online concierge system generates a training example for the findability model based on the item data for the item, item map data for the item map of the physical area within which pickers were collecting items, and the computed findability score for the time period in which pickers were collecting items. By generating these examples based on multiple items and at multiple physical areas with different item maps, the online concierge system can generate training examples for a findability model to predict the findability of items in candidate item maps.

The online concierge system computes 330 a map score based on the findability scores computed for the set of items in the candidate item map. A map score is a score representing an overall findability of items within a candidate item map. For example, the map score map simply be an average findability score of each of the set of items. Alternatively, the map score may be based on a weighted average of the findability scores. For example, the online concierge system may weight the findability score of an item based on the value of the item, the rate at which the item is purchased or ordered, or a rating for the item by users. In some embodiments, the online concierge system changes the weights applied to the findability scores of items based on how the purchase/order rates, values, or ratings of items changes over time. For example, a seasonal item may be given a higher weighting during the season when the item is popular and a lower weighting outside that season.

In some embodiments, the online concierge system computes the map score based on findability scores for a subset of the full set of items located within the physical area. The online concierge system may identify a subset of items in the candidate item map, compute findability scores for this subset of items, and compute the map score for the candidate item map based on the findability scores for the subset. The online concierge system may identify the subset based on how often the items are ordered or purchased within the physical area or the values of the items. For example, the online concierge system may identify the top n most ordered or purchased items and compute the findability scores of this subset of the total items within the physical area. Alternatively, the online concierge system may randomly select a subset of the items, and may weight this randomly selected subset based on the order/purchase rate or the value of items.

The online concierge system determines 340 whether a stopping condition is met based on the computed map score. The stopping condition is a condition that, when met, causes the online concierge system to stop the iterative process of generating candidate maps. For example, the stopping condition may be based on whether a certain number of iterative cycles have been performed, the map score for the current candidate map is less than the map score of the previous candidate map, or whether the map score exceeds some threshold value. If the stopping condition is not met, the online concierge system performs the iterative generation process again by applying the map rules to the candidate item map to generate another candidate map, computing findability scores for items based on that new candidate map, and computing a map score for that new candidate map. The online concierge system continues this process of generating candidate item maps based on previously generated candidate item maps until the stopping condition is met.

When the stopping condition is met, the online concierge system ends 350 the iterative generation process and selects 360 the generated candidate item map with the highest map score of the generated candidate item maps as the new item map for the physical area. The online concierge system transmits 370 the new item map to a user associated with the physical area, such as an operator of a retailer location associated with the physical area.

In some embodiments, the online concierge system transmits information identifying items that are most difficult to find to a retailer associated with a physical area. For example, the online concierge system may compute the findability scores of items based on the initial item map for the physical area and identify those items that have the lowest findability scores. In some cases, the online concierge system only identifies items if they are sufficiently popular (e.g., they are ordered or purchased at a rate above some threshold value) to ensure that the online concierge system notifies a retailer that a popular item is difficult to find.

In some embodiments, the online concierge system uses the predicted findability scores for items to adjust a consideration provided to pickers to service orders. The online concierge system identifies the items that are included in an order and computes a findability score for the items using the findability model and the item map for the physical area in which the items are located. The online concierge system computes an overall findability score for the order and adjusts the consideration provided to the picker to service the order. For example, if the overall findability of the order is low, then the online concierge system may provide additional consideration to the picker.

Figure 4B:
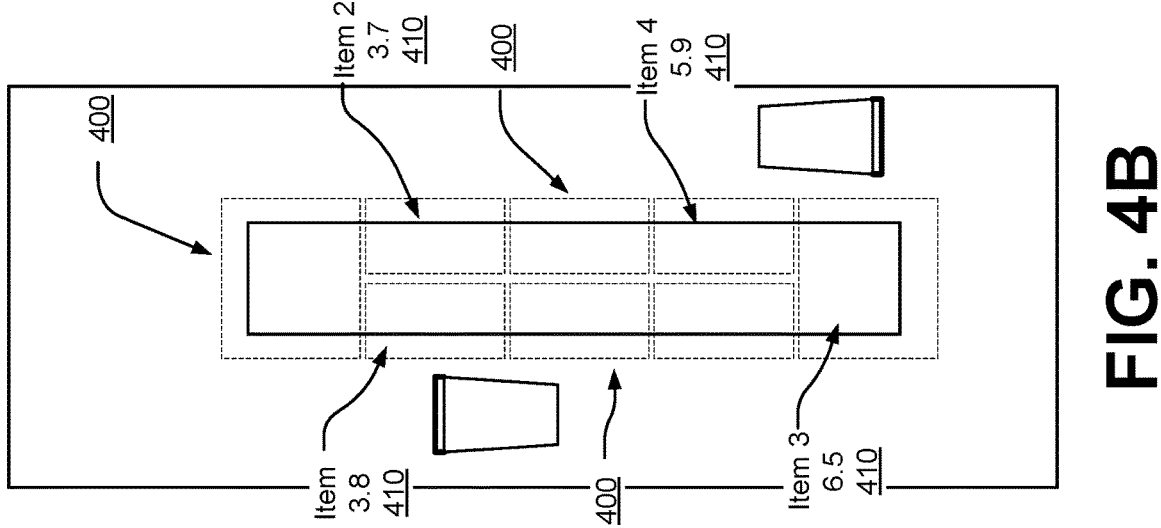
FIGS. 4A and 4B illustrate physical areas in which items are located within the physical areas according to item maps, in accordance with some embodiments.
Figure 4A:
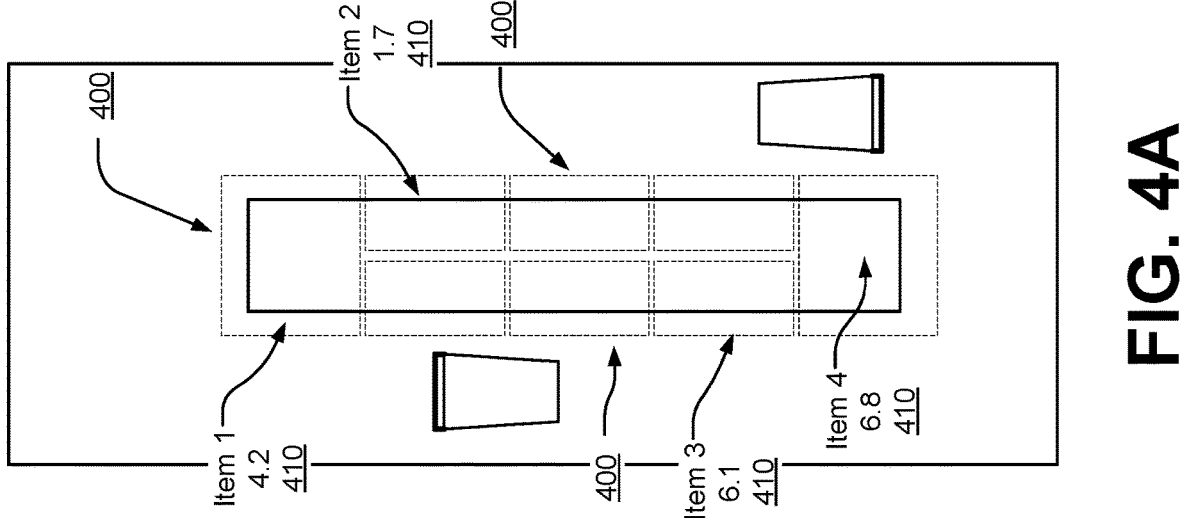

FIGS. 4A and 4B illustrate physical areas in which items 410 are located within the physical areas according to item maps, in accordance with some embodiments. In the illustrated embodiments, the item map allocates items within the physical area within cells 400 in which the items 410 should be placed. The item map of FIG. 4A may represent an initial item map and the item map of FIG. 4B may represent a candidate item map generated based on the initial item map. Each item is illustrated with a corresponding findability score, and the map score for each item map may be a sum of the findability scores of the items. Thus, the map score of the item map of FIG. 4A would be 18.8 whereas the map score of the item map of FIG. 4B would be 19.9. As described above, the online concierge system may continually adjust where items are located in item maps until a stopping condition is met (e.g., until the map score of an item map exceeds 25).

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality.

Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed by a computer system comprising a processor and a computer-readable medium, the method comprising:

accessing an initial item map indicating locations of a set of items within a physical area;

iteratively generating candidate item maps based on the initial item map by:

applying a set of map rules to an item map of a previous iteration to generate a candidate item map;

computing findability scores for the set of items by applying a findability model to the set of items and the candidate item map, wherein the findability model is a machine-learning model that is trained to compute a findability score for an item within an item map based on the item map and item data describing the item;

computing a map score for the candidate item map based on the findability scores for the set of items and the candidate item map;

determining whether a stopping condition is met based on the computed map score for the candidate item map; and responsive to determining that the stopping condition being met, ending the iterative generation of candidate item maps;

selecting a new item map for the physical area based on the iterative generation of candidate item maps; and transmitting the new item map for the physical area to a user device associated with the physical area.

2. The method of claim 1, wherein computing the findability scores for the set of items comprises:

applying the findability model to contextual data describing a context in which users search for items in the physical area.

3. The method of claim 1, further comprising:

training the findability model based on a set of training examples, wherein each training example comprises item data describing an item, item map data describing an item map for a physical area in which the item is located, and a label indicating a findability score for the item.

4. The method of claim 3, further comprising:

generating the label for each of the set of training examples by computing a find rate for the item, wherein the find rate is a rate at which pickers find the item of the training example in a physical area that is set up according to the item map of the training example.

5. The method of claim 3, further comprising:

generating the label for each of the set of training examples by computing an average time for pickers to find the item of the training example in a physical area that is set up according to the item map of the training example.

6. The method of claim 1, wherein the set of items is a subset of a full set of items located within the physical area, and wherein the map score for the candidate map is computed based on findability scores for the subset.

7. The method of claim 1, wherein computing the map score for the candidate map comprises:

computing a weighted average of the findability scores for the set of items.

8. The method of claim 7, wherein computing the weighted average of the findability scores comprises weighting the findability scores based on values of the corresponding items.

9. The method of claim 1, wherein determining whether the stopping condition is met comprises:

determining whether the map score exceeds a threshold value.

10. The method of claim 1, wherein determining whether the stopping condition is met comprises:

determining whether a map score for the item map of the previous iteration exceeds the computed map score for the candidate item map.

11. A non-transitory computer-readable medium storing instructions that, when executed by a processor, cause the processor to perform operations comprising:

accessing an initial item map indicating locations of a set of items within a physical area;

iteratively generating candidate item maps based on the initial item map by:

applying a set of map rules to an item map of a previous iteration to generate a candidate item map;

computing findability scores for the set of items by applying a findability model to the set of items and the candidate item map, wherein the findability model is a machine-learning model that is trained to compute a findability score for an item within an item map based on the item map and item data describing the item;

computing a map score for the candidate item map based on the findability scores for the set of items and the candidate item map;

determining whether a stopping condition is met based on the computed map score for the candidate item map; and responsive to determining that the stopping condition being met, ending the iterative generation of candidate item maps;

selecting a new item map for the physical area based on the iterative generation of candidate item maps; and transmitting the new item map for the physical area to a user associated with the physical area.

12. The non-transitory computer-readable medium of claim 11, wherein computing the findability scores for the set of items comprises:

applying the findability model to contextual data describing a context in which users search for items in the physical area.

13. The non-transitory computer-readable medium of claim 11, wherein the operations further comprise:

training the findability model based on a set of training examples, wherein each training example comprises item data describing an item, item map data describing an item map for a physical area in which the item is located, and a label indicating a findability score for the item.

14. The non-transitory computer-readable medium of claim 13, wherein the operations further comprise:

generating the label for each of the set of training examples by computing a find rate for the item, wherein the find rate is a rate at which pickers find the item of the training example in a physical area that is set up according to the item map of the training example.

15. The non-transitory computer-readable medium of claim 13, wherein the operations further comprise:

generating the label for each of the set of training examples by computing an average time for pickers to find the item of the training example in a physical area that is set up according to the item map of the training example.

16. The non-transitory computer-readable medium of claim 11, wherein the set of items is a subset of a full set of items located within the physical area, and wherein the map score for the candidate map is computed based on findability scores for the subset.

17. The non-transitory computer-readable medium of claim 11, wherein computing the map score for the candidate map comprises:

computing a weighted average of the findability scores for the set of items.

18. The non-transitory computer-readable medium of claim 17, wherein computing the weighted average of the findability scores comprises weighting the findability scores based on values of the corresponding items.

19. The non-transitory computer-readable medium of claim 11, wherein determining whether the stopping condition is met comprises:

determining whether the map score exceeds a threshold value.

20. A system comprising a processor and a non-transitory computer-readable medium storing instructions that, when executed by the processor, cause the processor to perform operations comprising:

accessing an initial item map indicating locations of a set of items within a physical area;

iteratively generating candidate item maps based on the initial item map by:

applying a set of map rules to an item map of a previous iteration to generate a candidate item map;

computing findability scores for the set of items by applying a findability model to the set of items and the candidate item map, wherein the findability model is a machine-learning model that is trained to compute a findability score for an item within an item map based on the item map and item data describing the item;

computing a map score for the candidate item map based on the findability scores for the set of items and the candidate item map;

determining whether a stopping condition is met based on the computed map score for the candidate item map; and responsive to determining that the stopping condition being met, ending the iterative generation of candidate item maps;

selecting a new item map for the physical area based on the iterative generation of candidate item maps; and transmitting the new item map for the physical area to a user associated with the physical area.

\* \* \* \* \*